Aug. 28, 1956
W. V. SPURLIN
2,760,504
IN AND OUT SPIRAL TROUGH PARTS CLEANER
Filed Feb. 18, 1953
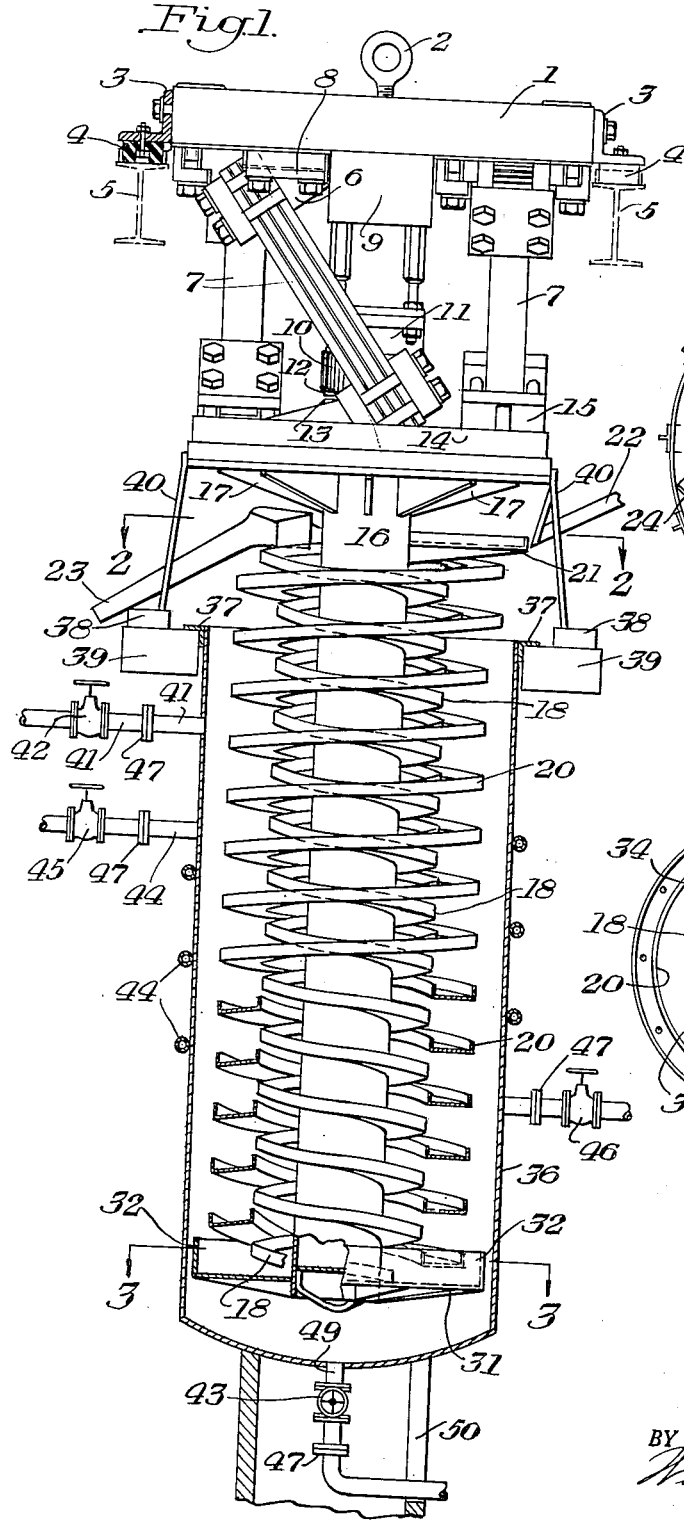
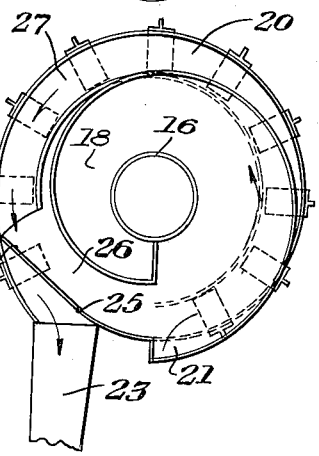
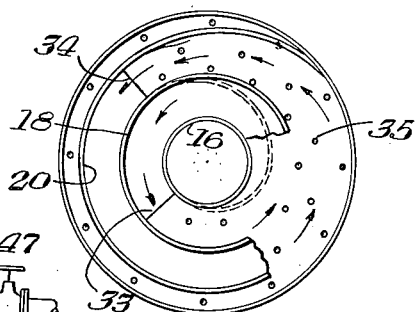
INVENTOR.
William V. Spurlin.
BY
William D. Carothers
HIS ATTORNEY.

United States Patent Office 2,760,504
Patented Aug. 28, 1956

2,760,504

IN AND OUT SPIRAL TROUGH PARTS CLEANER

William V. Spurlin, Indiana, Pa., assignor to Syntron Company, Homer City, Pa., a corporation of Delaware Application February 18, 1953, Serial No. 337,456

4 Claims. (Cl. 134—132)

This invention relates generally to vibratory feeder conveyers and more particularly to a suspended conveyer having a continuous track that passes downwardly and then upwardly with the inlet and outlet being adjacent the top to permit the material traveling therealong to be treated.

In treating or washing or cleaning articles it is necessary to insert the same in a basket or other container, after which they are lowered into a tank containing a cleaning fluid or detergent, and after swishing the basket around it is again raised and the articles are then dumped from the basket and rearranged or sorted, thus requiring handling after the treating or cleaning process. In this method of cleaning, the articles themselves are not independently moved or otherwise excited, which makes it difficult to get them clean, and it takes a considerable period of time. One has to depend upon the action of the cleaning liquid to insure a clean part.

Frequently, it is desirable to have the bulk of the material or articles treated by or otherwise exposed to a gas or for drying the same under a controlled atmosphere. Such an operation requires a special handling of the material, and it is difficult to perform, owing to the fact that the material itself is not moved or otherwise agitated by a paddle or a stirrer or given some other form of stirring motion.

The principal object of this invention is to provide a suspended conveyer for traveling articles one at a time or in a mass, or for traveling granular or powdered material, all of which are to receive a treatment, and wherein the articles or material are caused to travel along the helical track and back, and at the same time by a vibratory action, wherein each article and particle would be vibrated, subjecting it properly to the treatment intended and without handling.

Another object of this invention is the provision of a device for feeding and drying bulk material permitting separate particles of the material to be jogged or otherwise vibrated in their course of travel through a medium where a heat treatment or other treatment is supplied.

Another object of this invention is the provision of a suspended electromagnetic vibratory conveyer for conveying the articles or parts along a continuous path, suspended in a liquid wherein the parts being traveled along the conveyer will become cleaned owing to their individual agitation, as they are passed through the liquid.

Another object is the provision of a suspended vibratory conveyer that may be constructed to travel articles or material in an endless circular path and be deposited in one or more of a series of tanks to effect different treatments on the articles as they are individually jostled when they are being traveled through the circuit.

Either the conveyer or the tanks may be removed one from the other, or the conveyer may be inserted in turn into a series of tanks or vice versa. The conveyer may be easily handled by a crane carrying the same from one tank to the other.

Other objects and advantages appear hereinafter in the following description and claims.

The accompanying drawings show for the purpose of exemplification, without limiting the invention or claims thereto, certain practical embodiments of the invention wherein:

Fig. 1 is a side elevation of the conveyer suspended in a tank, the latter being in section.

Fig. 2 is a sectional view taken on the line 2—2 of Fig. 1.

Fig. 3 is a cross-sectional view taken along the line 3—3 of Fig. 1.

Referring to the drawings, the suspended conveyer is provided with the base member 1 having an eye 2 in the central axis for the purpose of lifting and moving the device by means of a crane. The massive base 1 is provided with angle irons 3 that rest on the resilient feet elements 4 to support the same on the spaced I beams 5. The I beams may be part of a material bunker structure, or part of the building itself.

The underside of the massive base 1 is provided with a plurality of blocks 6 having a sloping face for receiving the spring members 7. The blocks 6 are adjustably mounted by the clamping members 8 which are bolted to the under side of the massive base 1. The working length of the springs 7 can be varied to tune the natural period of the unit to a few cycles above the frequency of the applied current.

A block member 9 is employed to suspend the field and core member 10 and 11 from the central axis of the massive base 1 so as to position the pole face 12 of the field core from the pole face 13 from the armature which is secured to the frame 14. The frame 14 is likewise provided with blocks 15 having a sloping face parallel with the faces of the blocks of the base 1 for receiving the other ends of the springs 7. The lever springs 7 are bolted at both ends and are disposed at an angle although one set of springs is provided for each side of the conveyer member, there being a total of four sets in all and each of the said springs comprises several leaves, the exact number required depending upon the size and weight of the spiral trough.

The frame member 14 has the central column 16 secured to the underside thereof and braced by the angle plates 17. The central column 16 is preferably hollow and is suspended concentrically of the same central vertical axis. The axis of the column is concentric with the central axis passing through the motor and also concentric to the distribution of the resilient members that support the frame 14 for vibration.

The central column 16 is hollow and may or may not be closed at its lower end. The conveyer track which passes down the column and back, may be secured thereto by welding. As illustrated in the drawing, the central or inner track member 18 is helically wound around and attached to the column 16. This track extends in the direction for the purpose of conveying material downwardly in accordance with the disposition of the springs 7.

The outer track 20 is secured to the outer edges of the downward track 18, and it is sloped in the opposite direction so that it will convey material upwardly therealong. The downward conveyer track 18 has the inlet 21 which may be supplied with material by means such as the chute 22 that receives material from a hopper or other similar device. The conveyer track 20 is provided with a chute 23 for discharging the material therefrom. As shown in Fig. 2, the upwardly conveying track 20 is provided with a valve member 24 in front of the outlet chute 23 which is pivoted at 25 for directing the material on the conveyer across the conveyer surface 26 to the inlet 21 and thence along the downward track 18 for the purpose of recirculating the material in a continuous up and down path.

The track, as illustrated, may be adapted to move the material in bulk, whether they be articles or granules or powder, or it may be constructed to move individual articles, in which case, the size of the article would be substantially the width of the track such as illustrated at 27. More than one article could be inserted at the start of the downward track 18, however, as it narrows down, it becomes the same width as the track 20, in which case, the articles would pass in single file and thus move down and back the conveyer track.

As shown in Figs. 1 and 3, the downward conveyer track 18 terminates at 33 where the same empties out into the transfer pan member 31, which is provided at the upwardly extending wall 32. The articles or material will flow around in a counterclockwise direction, as shown in Fig. 3, until they come to the beginning of the upward conveyer track 20, as indicated at 34, wherein the elements travel up to the discharge end thereof. As shown in Fig. 3, the transfer pan may be provided with holes, as illustrated at 35, when it is desired to wash the articles being conveyed in a liquid and it is desired to drain the liquid from the transfer pan when the conveyer is removed from the tank member 36.

The tank 36, as illustrated in Fig. 1, is provided with a flange member 37 which supports it in the opening of the floor 38. The flange 37 rests on the retractable members 39 that are secured to the underside of the floor 38. A flexible canopy such as illustrated at 40 may be employed to enclose the inlet and outlet of the conveyer to the track for the retention of heat or any other gaseous treatment given to the material as it passes along the conveyer through the tank.

An inlet pipe 41 is provided with a valve 42 and is for the purpose of admitting liquid or gas such as steam or other type of gas for treating material. The outlet pipe is illustrated at 49 at the bottom thereof, and is provided with the valve 43 for drawing off or exhausting the gases or liquids that may be inserted in the tank through the pipe 41. The washing liquid solutions may be water, aqueous salts, or such liquids as naphtha or carbon tetrachloride. The tank 36 may be heated by means of the steam coils 44 which are wound around and secured to the tank 36 and are controlled by the inlet valve 45 and the outlet valve 46. Each of the pipe connections 41 and 44 is provided with a quick acting coupler such as illustrated at 47 for the purpose of coupling and uncoupling the tank from the fluid supply system. A similar coupling is provided on the outlet pipe 49.

A lift or elevator such as illustrated at 50, which is an open tubular column that encircles and engages the underside of the tank 36, may be employed for raising the tank in position wherein it can be interlocked or supported at its upper end as previously described. When it is desirable to let the conveyor remain stationary and remove the tank, the latter is disconnected from the associated lines and the retracting supports 39 are withdrawn and the tank then is permitted to descend by means of the elevator member 50 which lowers the same and conveys the tank from the vicinity of the suspended conveyer. Thus any articles placed on the inlet and permitted to travel down around the conveyer track 18, across the transfer pan 31 and up the conveyer track 20 to the outlet are jostled and joggled along as they travel and if the tank 36, in which the conveyer is immersed is filled with a cleaning fluid, the jostled article will be thoroughly cleansed by the liquid as it is joggled in being conveyed therethrough.

If, on the other hand, it is necessary to heat the liquid, the steam is allowed to flow through the pipe 44 to heat the tank and the liquid without heating the motor parts.

It is sometimes desirable to have the liquid continuously pass through the tank, in which case, the valve 43 at the discharge end of the tank is opened to permit the liquid to escape while the inlet valve 42 is being continuously supplied by the liquid passing through the line 41 at the upper end of the tank.

I claim:

1. A conveyer comprising a resiliently supported reaction member, a frame, a plurality of flexible members secured to said reaction member and to said frame to support the latter for reciprocation in a confined inclined arcuate path of movement about a vertical axis, driving means for imparting energy impulses to reciprocate said frame in synchronism with the frequency of said energy impulses, a first upwardly open conveyer track secured to said frame and spiraling therefrom, a second upwardly open conveyer track secured to and spiraling in the opposite direction along the outside of the first track, an upwardly open transfer pan supported by said conveyer tracks on the outer ends thereof for receiving material from one track and delivering it to the other track by conveying action, and an inlet and an outlet for delivering material to and removing material from said tracks after having traveled along one track across the transfer pan and along the other track.

2. A structure of claim 1 which also includes a tank into which the conveyer mechanism is suspended from said frame, said tank encircling said both tracks below the inlet and outlet, to carry liquid for bathing the materials conveyed along both tracks.

3. The structure of claim 2 characterized in that said transfer pan perimeter is closely adjacent the vertical wall of the tank.

4. The structure of claim 1 characterized in that the perimeter of said transfer pan is greater in radius than the radii of both tracks and smaller than said tank to enable it to fit into the latter and catch any material falling off both tracks.

References Cited in the file of this patent
UNITED STATES PATENTS

| | | |
|---|---|---|
| 2,119,191 | Wilkinson | May 31, 1938 |
| 2,662,851 | Jones | Dec. 15, 1953 |

FOREIGN PATENTS

| | | |
|---|---|---|
| 695,938 | Germany | Sept. 6, 1940 |
| 943,865 | France | Mar. 21, 1949 |